(12) United States Patent
Gibson, Jr.

(10) Patent No.: US 7,819,231 B2
(45) Date of Patent: Oct. 26, 2010

(54) S CAM BUSHING ASSEMBLY

(76) Inventor: William J. Gibson, Jr., R.R. 1, Beardsley, MN (US) 56211

( * ) Notice: Subject to any disclaimer, the term of this patent is extended or adjusted under 35 U.S.C. 154(b) by 1223 days.

(21) Appl. No.: 10/673,641

(22) Filed: Sep. 26, 2003

(65) Prior Publication Data
US 2004/0178598 A1    Sep. 16, 2004

Related U.S. Application Data

(60) Provisional application No. 60/454,744, filed on Mar. 14, 2003.

(51) Int. Cl.
*F16D 51/00* (2006.01)
*F16D 65/00* (2006.01)
(52) U.S. Cl. .................... 188/330; 188/329; 403/365
(58) Field of Classification Search ............ 188/329, 188/330, 73.31, 205 R, 206 R; 403/365, 403/367
See application file for complete search history.

(56) References Cited

U.S. PATENT DOCUMENTS

| | | | | |
|---|---|---|---|---|
| 2,382,554 A | * | 8/1945 | Eksergian et al. | 188/153 A |
| 2,886,141 A | * | 5/1959 | House | 188/78 |
| 3,076,531 A | * | 2/1963 | Fisher et al. | 188/205 R |
| 3,497,037 A | * | 2/1970 | Deibel | 188/329 |
| 4,346,535 A | * | 8/1982 | Asano et al. | 451/239 |
| 4,576,488 A | * | 3/1986 | Steiner et al. | 384/291 |
| 4,838,389 A | * | 6/1989 | Mamery | 188/78 |
| 5,887,687 A | * | 3/1999 | Williams | 188/330 |
| 6,240,806 B1 | * | 6/2001 | Morris et al. | 74/567 |
| 6,450,073 B1 | * | 9/2002 | Boyer et al. | 82/129 |

* cited by examiner

*Primary Examiner*—Melody M Burch
(74) *Attorney, Agent, or Firm*—Patterson, Thuente, Christensen, Pedersen, P.A.

(57) ABSTRACT

A support assembly for supporting a S cam, the S cam being an intermediary device between a brake actuator and a set of wheel brakes and is generally an elongate metal rod shank having an S-head at one end and a set of splines at the other end, the S-head having at least one arm for engaging a respective brake shoe, whereby rotation of the S cam in a first direction causes the at least one arm of the S-head act on the brake shoe to frictionally engage the brake shoe with a brake drum, the brake drum being affixed to a wheel, includes single bushing rotationally supporting the S cam. A method of supporting the S cam is further included.

4 Claims, 3 Drawing Sheets

S CAM BUSHING ASSEMBLY

RELATED APPLICATION

The present patent application claims the benefit of U.S. Provisional Patent Application No. 60/454,744, filed Mar. 14, 2003, and incorporated herein in its entirety by reference.

TECHNICAL FIELD

The present application relates to brake actuation. More particularly, the present application relates to a bushing assembly for supporting what is commonly termed a S cam.

BACKGROUND OF THE INVENTION

S cams are widely used in the commercial trucking industry. The S cam is an intermediary device between a pneumatic brake actuator and a set of wheel brakes. The S cam is typically an elongate metal rod or shank having an S-head at one end and a set of splines at the other end. Each of the individual arms of the S-head engages a respective brake shoe. Rotation of the S cam causes the arms of the S-head to bear on the respective brake shoe, causing the brake shoe to frictionally engage the brake drum that is affixed to the wheel. In the past, the S cam has been rotationally supported by at least two bushings. A first bushing was positioned proximate the S-head and a second bushing was positioned proximate the splines.

The bushings have typically been exposed to the elements as the S cam is mounted exposed rearward of the axle of the vehicle. The intrusion of water, salt, and dirt into each of the bushings causes the bushings to fail in relatively short order. Replacement of the bushings is a necessarily frequent task that keeps the vehicle off the road for a significant period of time.

More recently, a Canadian company has provided a single tube that substantially encloses the elongate shank of the S cam and the two bushings.

There is a need in the industry to reduce the number of bushings that support the S cam and to provide for a longer service life of such bushing.

SUMMARY OF THE INVENTION

The present invention substantially meets the aforementioned needs of the industry. The number of bushings noted in the prior art is reduced to a single bushing. The single bushing of the present invention supports substantially the entire shank of the S cam from proximate the S-head to the splines of the S cam. Preferably, the single bushing is enclosed within a full-length bushing holder. The bushing holder substantially encloses the bushing and provides end seals to isolate the single bushing from the environmental effects noted above including, moisture, salt, and road grit. The use of a single bushing and isolating the single bushing from the environment results in the single bushing requiring essentially no maintenance other than the occasional addition of lubrication. Accordingly, the down time for vehicles employing the S cam bushing assembly of the present invention is greatly reduced.

The present invention is a support assembly for supporting a S cam, the S cam being an intermediary device between a brake actuator and a set of wheel brakes and is generally an elongate metal rod shank having an S-head at one end and a set of splines at the other end of the shank, the S-head having at least one arm for engaging a respective brake shoe, whereby rotation of the S cam in a first direction causes the at least one arm of the S-head to act on the brake shoe to frictionally engage the brake shoe with a brake drum, the brake drum being affixed to a wheel. The support assembly includes a single bushing rotationally supporting the S cam. The present invention is further a method of supporting the S cam.

DETAILED DESCRIPTION OF THE DRAWINGS

Figure 1:
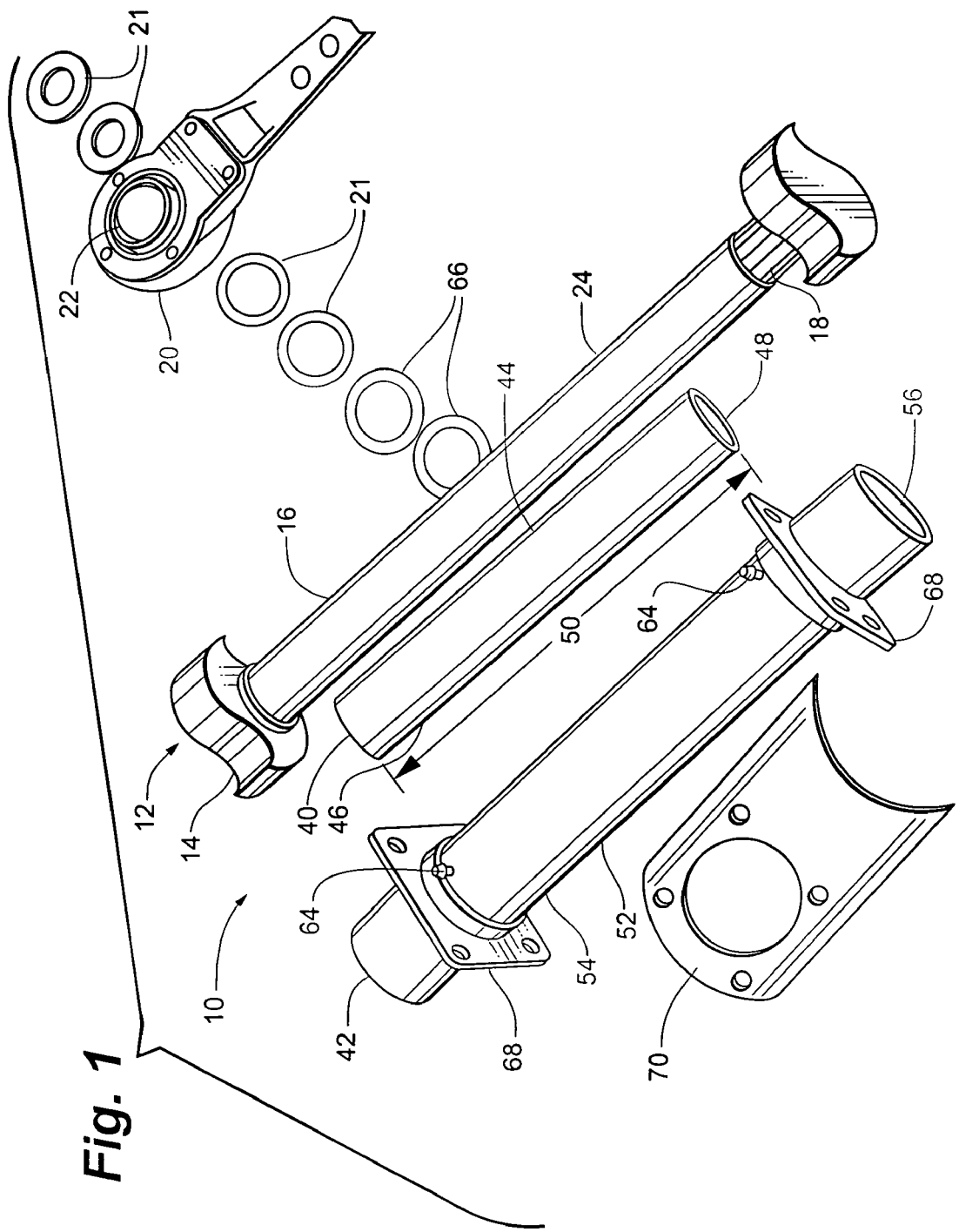
FIG. 1 is an exploded view of the S CAM bushing assembly of the present invention.
Figure 2:
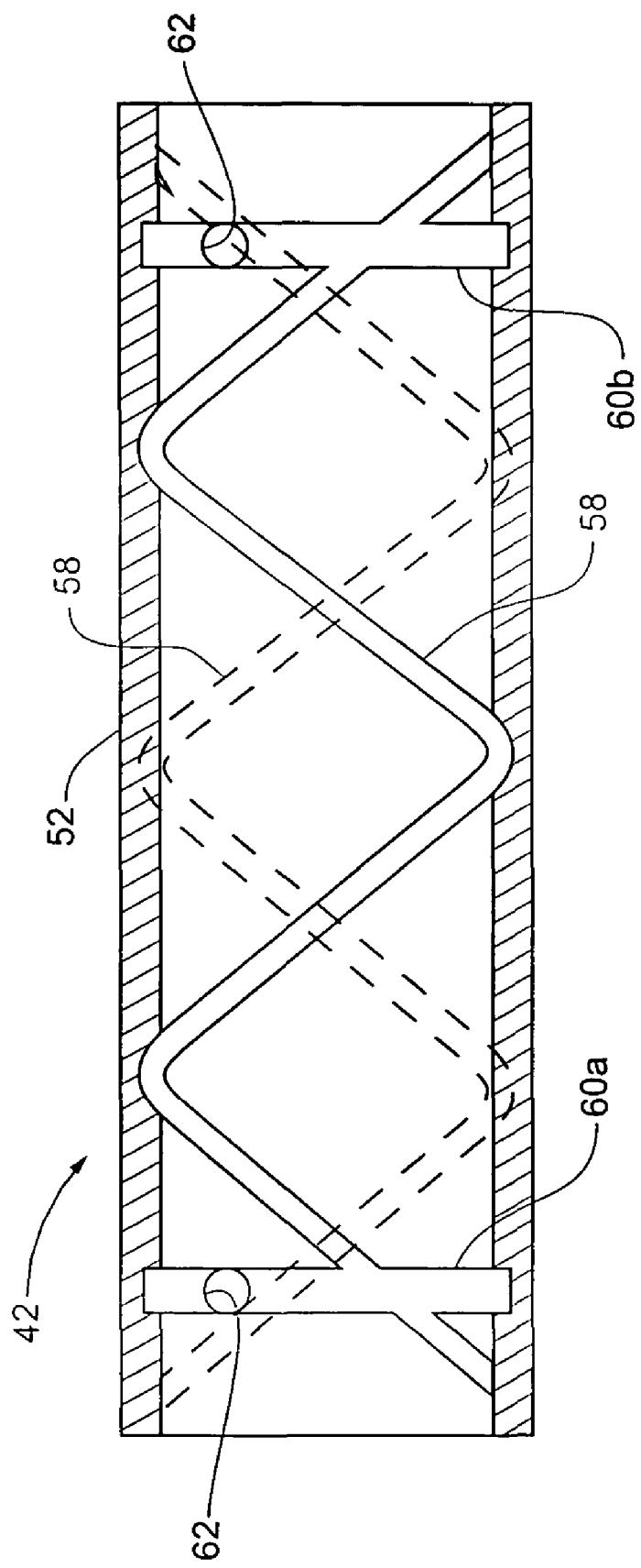
FIG. 2 is a sectional view of the bushing holder.
Figure 3:
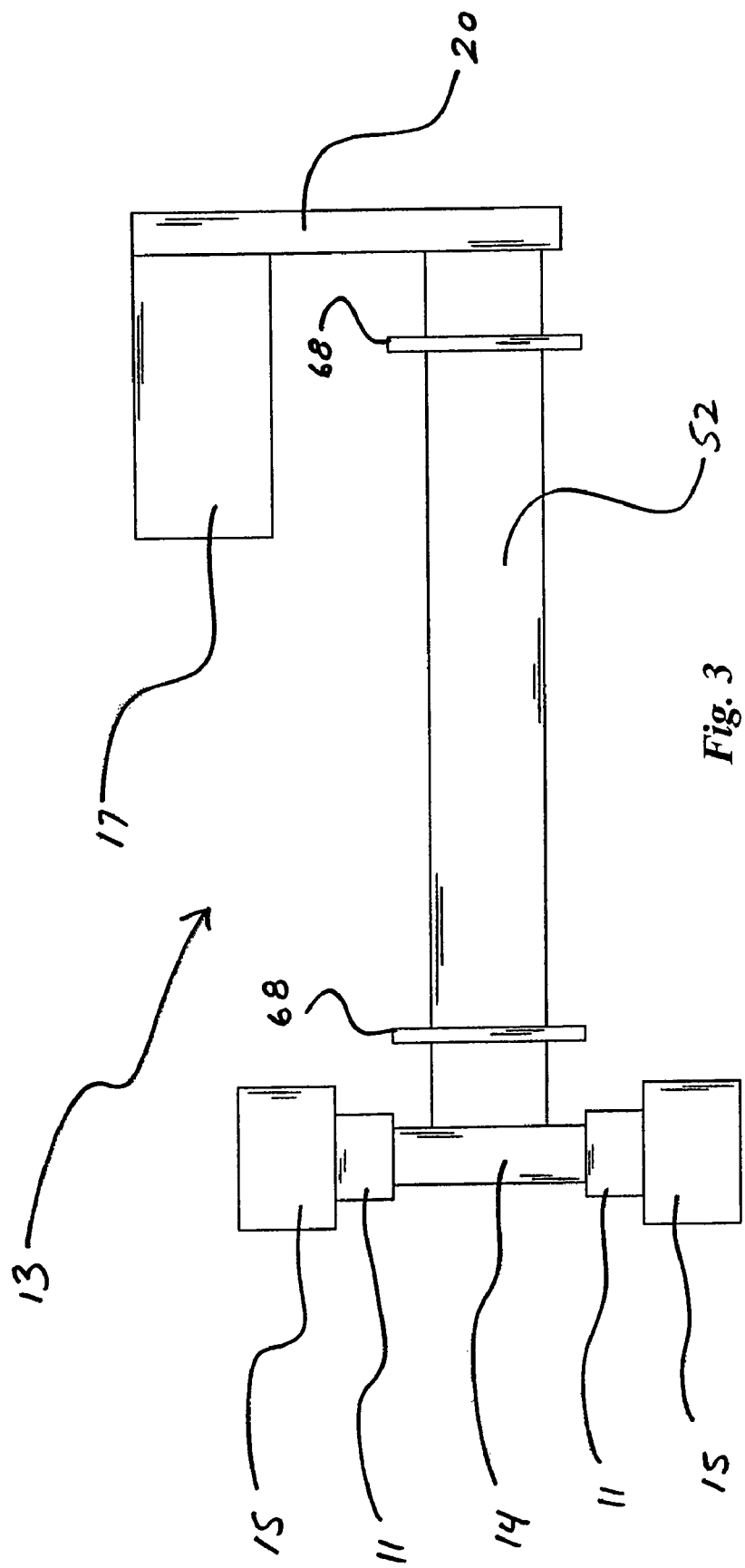
FIG. 3 is a schematic representation of the S CAM bushing assembly of the present invention.

The S cam bushing assembly of the present invention is shown generally at 10 in the Figures.

The S cam 12 has an S-head 14 fixably coupled to an elongate shank 16. When viewed end-on, the S-head 14 has a generally S-shape having two opposed arms for engaging respective brake shoes 11 in a brake assembly 13. Rotation of the S-head 14 relative to the brake shoes 11 in a first direction is effective for compressively, frictionally engaging the brake shoes 11 with a brake drum 15.

The shank 16 preferably has an elongate cylindrical shape. The shank 16 is preferably a solid metallic component that is usually forged or cast with the S-head 14.

A series of splines 18 are formed on the end of the shank 16 opposite to the S-head 14. A slack adjuster 20 having a splined insert 22 is adapted to engage the splines 18. The slack adjuster 20 is operably coupled to a pneumatic brake actuator 17. Linear motion imparted to a distal end of the slack adjuster 20 imparts rotational motion to the S cam 12 for actuating the brakes of the vehicle. A plurality of washers 21 may be disposed on either side of the slack adjuster 20.

In the past, the outside margin diameter of the shank 16 was left essentially as it was formed in a forging or casting operation with aa generally rough surface with no particular O.D. dimension. With the present invention, the outside diameter of the shank 16 is machined uniformly to a certain outside diameter having a substantially smooth surface.

The S cam bushing assembly 10 further includes two major components: bushing 40 and bushing holder 42.

The bushing 40 has an elongate tubular body 44. The tubular body 44 has a known outside diameter 46 and a known inside diameter 48. The inside diameter 48 is slightly greater than the outside diameter of the machined shank 24 of the S cam 12 in order to rotationally support the S cam 12. The tubular body 44 has a length 50. The length 50 is substantially coextensive with the length of the shank 16. Accordingly, when the bushing 40 is disposed on the S cam 12, the bushing 40 extends from proximate the S-head 14 to proximate the splines 18. The bushing 40 is preferably made of plastic material, although other compositions, including metal having suitable wear characteristics may also be used.

The bushing holder 42 is a generally thin walled tubular body 52. The tubular body 52 has an outside diameter 54 and an inside diameter 56. The inside diameter 48 of the bushing 40 may be 0.001 to 010 inches less than the outside diameter of the machined shank 24 and is preferably 0.002-0.005 inches less than the outside diameter of the machined shank 24. A minimal annular space is thereby defined between the bushing 40 and the bushing holder 42. The bushing 40 is preferably press fit into the bushing holder 42.

In a preferred embodiment, at least one spiral groove 58 of the bushing 40 is preferably press fit into the bushing holder 42 and preferably two intersecting spiral grooves 58 are defined in the surface of the inside diameter 56. Additionally, two circumferential grooves 60a, 60b are defined in the surface of the inside diameter 56. Each of the respective grooves 60a, 60b intersects the single spiral groove 58 or the intersecting spiral groove 58. A threaded fitting bore 62 is defined through the tubular body 52 and intersects each of the circumferential grooves 60a, 60b, respectively. A grease fitting 64 is preferably threaded into each of the threaded fitting bores 62. A suitable lubricant forced through the respective grease fitting 64 fills the respective circumferential groove 60a, 60b and then travels along the path of intersection spiral groove(s) 58 to ensure that the minimal annular space defined between the inside diameter 56 of the bushing holding 42 and the outside diameter 46 of the bushing 40 is substantially filled with lubricant.

End seals 66 are disposed in each end of the tubular body 52. The outside diameter of the respective end seals 66 closely engages the inside diameter 56 of the tubular body 52. The inside diameter of the end seals 66 is such that the end seal 66 closely engages the outside margin of the machined shank 24 of the S cam 12. The respective end seals 66 in cooperation with the bushing holder 42 complete the environment isolation of the bushing 40.

Brackets 68 may be welded to the exterior margin of the tubular body 52. Each of the brackets 68 has suitable bores (four bores in FIG. 1) defined therein to be brought into registry with bores defined in an axle mount 70. The axle mount 70 is preferably welded to the axle of the vehicle. Suitable bolts may then couple the respective brackets 68 and axle mounts 70 for mounting the S CAM bushing assembly 10 to the vehicle. It is understood that different types of axles currently in use in the commercial truck market may require different means of affixing the S CAM bushing assembly 10 to the vehicle. Accordingly, one or both of the ends of the tubular body 52 may be welded to a vehicle component, thus eliminating the need for the bracket 68/axle mount 70.

It will be obvious to those skilled in the art that other embodiments in addition to the ones described herein are indicated to be within the scope and breadth of the present application. Accordingly, the applicant intends to be limited only by the claims appended hereto.

The invention claimed is:

1. A support assembly for supporting a S cam, the S cam being an intermediary device between a brake actuator and a set of wheel brakes and is generally an elongate metal shank having an S-head at a first end of the shank and a set of splines at the second end of the shank, the S-head having at least one arm for engaging a respective brake shoe, whereby rotation of the S cam in a first direction causes the at least one arm of the S-head to act on the brake shoe to frictionally engage the respective brake shoe with a brake drum, the support assembly comprising:
  a single elongate bushing rotationally supporting and substantially coextensive along the length of the S cam shank, the bushing extending from proximate the S-head to proximate the splines; and
  a bushing holder, wherein the single elongate bushing is substantially enclosed within the bushing holder, wherein the bushing is substantially sealed within the bushing holder by a first and second seal member disposed at first and second ends of the bushing respectively, each of the seal members forming a sealing interface with the bushing holder and the S cam shank.

2. A support assembly for supporting a S cam, the S cam being an intermediary device between a brake actuator and a set of wheel brakes and is generally an elongate metal shank having an S-head at a first end of the shank and a set of splines at the second end of the shank, the S-head having at least one arm for engaging a respective brake shoe, whereby rotation of the S cam in a first direction causes the at least one arm of the S-head to act on the brake shoe to frictionally engage the respective brake shoe with a brake drum, the support assembly comprising:
  a single elongate bushing rotationally supporting and substantially coextensive along the length of the S cam shank, the bushing extending from proximate the S-head to proximate the splines, an S cam shank outside margin being machined and having a certain outside diameter, the S cam shank outside margin spaced apart from an inside margin of the bushing; and a bushing holder, wherein the single elongate bushing is substantially enclosed within the bushing holder.

3. A support assembly for supporting a S cam, the S cam having a generally elongate metal rod shank having an S-head at one end of the shank and a set of splines at the other end of the shank, the support assembly comprising:
  a single elongate bushing rotationally supporting and substantially coextensive along the length of the S cam shank, the bushing extending from proximate the S-head to proximate the splines; and
  a bushing holder, the bushing being substantially enclosed within the bushing holder, wherein the bushing is substantially sealed within the bushing holder by first and second seal members disposed at first and second ends of the bushing respectively, each of the seal members forming a sealing interface with the bushing holder and the s cam shank.

4. A method of supporting a S cam, the S cam being an intermediary device between a brake actuator and a set of wheel brakes and having a generally elongate metal shank having an S-head at one end and a set of splines at the other end, the S-head having at least one arm for engaging a respective brake shoe, whereby rotation of the S cam in a first direction causes the at least one arm of the S-head to act on the respective brake shoe to frictionally engage the brake shoe with a brake drum, the method comprising:
  rotationally supporting the S cam shank in a single elongate bushing, such that the bushing is substantially coextensive with the S cam shank and extends from proximate the S-head to proximate the splines;
  providing a bushing holder and substantially enclosing the bushing within the bushing holder; and
  substantially sealing the bushing within a bushing holder by first and second seal members disposed at first and second ends of the bushing respectively.

* * * * *